United States Patent
Leonelli, Jr.

(10) Patent No.: US 10,369,936 B2
(45) Date of Patent: Aug. 6, 2019

(54) CAMERA ARRANGEMENTS FOR MOTOR VEHICLES

(71) Applicant: VEONEER US, INC., Southfield, MI (US)

(72) Inventor: Frank Paul Leonelli, Jr., Goleta, CA (US)

(73) Assignee: VEONEER US, INC., Southfield, MI (US)

(*) Notice: Subject to any disclaimer, the term of this patent is extended or adjusted under 35 U.S.C. 154(b) by 292 days.

(21) Appl. No.: 15/130,133

(22) Filed: Apr. 15, 2016

(65) Prior Publication Data
US 2017/0297504 A1 Oct. 19, 2017

(51) Int. Cl.
| | |
|---|---|
| H04N 7/18 | (2006.01) |
| B60R 11/04 | (2006.01) |
| G03B 17/55 | (2006.01) |
| H04N 5/225 | (2006.01) |
| G03B 17/02 | (2006.01) |
| B60R 11/00 | (2006.01) |

(52) U.S. Cl.
CPC ........... B60R 11/04 (2013.01); G03B 17/02 (2013.01); G03B 17/55 (2013.01); H04N 5/2252 (2013.01); H04N 5/2253 (2013.01); H04N 5/2257 (2013.01); B60R 2011/0026 (2013.01); B60R 2011/0059 (2013.01)

(58) Field of Classification Search
CPC ......... B60R 11/04; G03B 17/55; H04N 5/225
USPC ...................................................... 348/148
See application file for complete search history.

(56) References Cited

U.S. PATENT DOCUMENTS

| | | | |
|---|---|---|---|
| 7,329,869 B2 * | 2/2008 | Cassel .................. | H04N 5/2252 250/339.03 |
| 2007/0069134 A1 | 3/2007 | Cassel et al. | |
| 2007/0132610 A1 * | 6/2007 | Guernalec ............... | B60R 11/04 340/932.2 |
| 2009/0190915 A1 | 7/2009 | Leonelli, Jr. | |
| 2010/0150545 A1 | 6/2010 | Imai et al. | |
| 2010/0194974 A1 * | 8/2010 | Hoshikawa ............ | G03B 17/14 348/373 |
| 2010/0231719 A1 | 9/2010 | Nakamura et al. | |
| 2013/0142504 A1 | 6/2013 | Warren et al. | |
| 2015/0365569 A1 | 12/2015 | Mai et al. | |

FOREIGN PATENT DOCUMENTS

EP     1 473 193 B1     9/2006

OTHER PUBLICATIONS

International Search Report and Written Opinion of PCT/US2017/26265, dated Jun. 21, 2017.

* cited by examiner

*Primary Examiner* — Richard T Torrente
(74) *Attorney, Agent, or Firm* — Brinks Gilson & Lione

(57) ABSTRACT

A camera arrangement for a motor vehicle is provided. The camera arrangement includes a front housing for at least partially enclosing a camera system. The front housing has a housing opening formed therethrough for allowing light to pass through to the camera system. A window is at least partially transparent to the light and covers the housing opening. A retainer is disposed adjacent to the window and includes a snapfit arrangement that engages the front housing to help hold the window in place relative to the front housing.

15 Claims, 5 Drawing Sheets

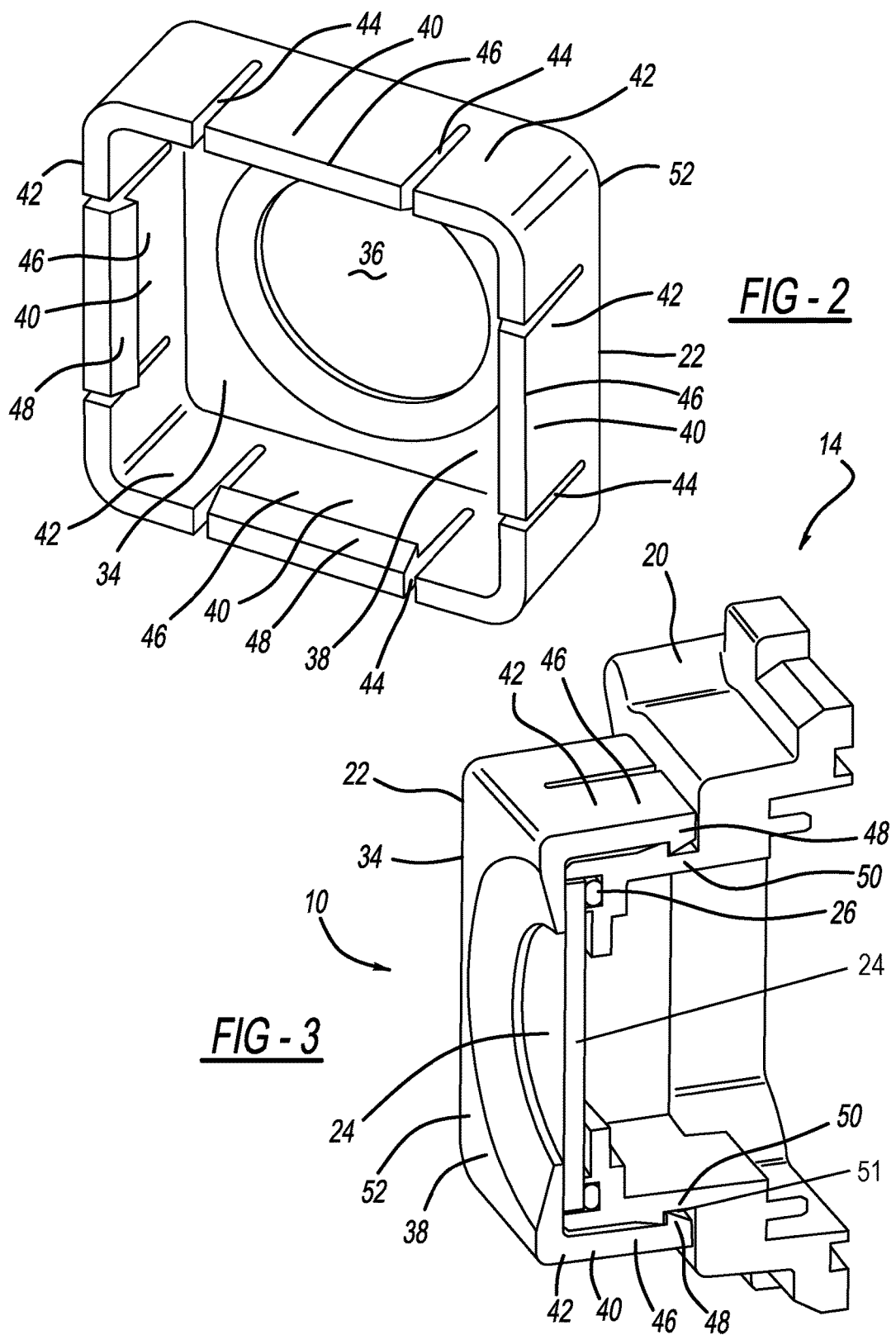

CAMERA ARRANGEMENTS FOR MOTOR VEHICLES

TECHNICAL FIELD

The technical field relates generally to camera arrangements for motor vehicles, and more particularly relates to camera arrangements for motor vehicles including a front housing that at least partially encloses a camera system and a snapfit arrangement for engaging or attaching to the front housing.

BACKGROUND

In recent years, vehicle drive supporting systems that include a camera mounted on the motor vehicle have been proposed. In many of these systems, a camera is used to collect forward data in a vehicle running direction, e.g., forward direction, to provide information for safety to the driver and/or to facilitate automatically performing a vehicle control operation or the like. For example, thermal imaging night vision cameras can be attached to the front end of motor vehicles for assisting drivers in detecting pedestrians and/or animals.

Such cameras typically include a protective outer window that forms part of a sealed enclosure assembly system. A non-limiting example of a camera and a protective outer window that forms part of a sealed enclosure for the camera is described in U.S. Pat. No. 7,329,869, filed Sep. 13, 2005, which is commonly owned by the assignee of the present application and is hereby incorporated by reference in its entirety for all purposes. Generally, a protective outer window is secured to a sealed enclosure using some form of threaded fastening arrangement (e.g. threaded fasteners, twist-on, or the like). Moreover, typically the sealed enclosure assembly system together with the camera is attached to the motor vehicle using an additional threaded fastening arrangement. There is a need to improve such attachment means so that the various attachments associated with the camera arrangement are relatively quick, simple and inexpensive, preferably without requiring any special tools to facilitate assembly of the camera arrangement and/or attachment of the camera arrangement to the motor vehicle.

BRIEF SUMMARY

Camera arrangements for motor vehicles are provided herein. In accordance with an exemplary embodiment, a camera arrangement for a motor vehicle includes a front housing for at least partially enclosing a camera system. The front housing has a housing opening formed therethrough for allowing light (e.g., visible light, thermal scene energy or electromagnetic radiation in the infrared (IR) spectrum (IR light), or other detectable frequencies of electromagnetic radiation used in various camera system) to pass through to the camera system. A window is at least partially transparent to the light and covers the housing opening. A retainer is disposed adjacent to the window and includes a snapfit arrangement that engages the front housing to help hold the window in place relative to the front housing.

In accordance with another exemplary embodiment, a camera arrangement for a motor vehicle is provided. The camera arrangement includes a camera system. A front housing is at least partially enclosing the camera system and is configured for mounting on a component of the motor vehicle having a snapfit arrangement. The front housing has one or more recessed portions configured to receive the snapfit arrangement for coupling the camera arrangement to the component of the motor vehicle.

Further objects, features, and advantages of the invention will become apparent to those skilled in the art to which the present invention relates from consideration of the following description and the appended claims, taken in conjunction with the accompanied drawings.

BRIEF DESCRIPTION OF THE DRAWINGS

The drawings described herein are for illustration purposes only and are not intended to limit the scope of the present disclosure in any way.

FIG. 2 is a perspective view of a retainer in accordance with an exemplary embodiment;

FIG. 3 is a perspective sectional view of a camera arrangement in accordance with an exemplary embodiment;

DETAILED DESCRIPTION OF THE INVENTION

The following description is merely exemplary in nature and is not intended to limit the present disclosure or its application or uses.

Figure 1:
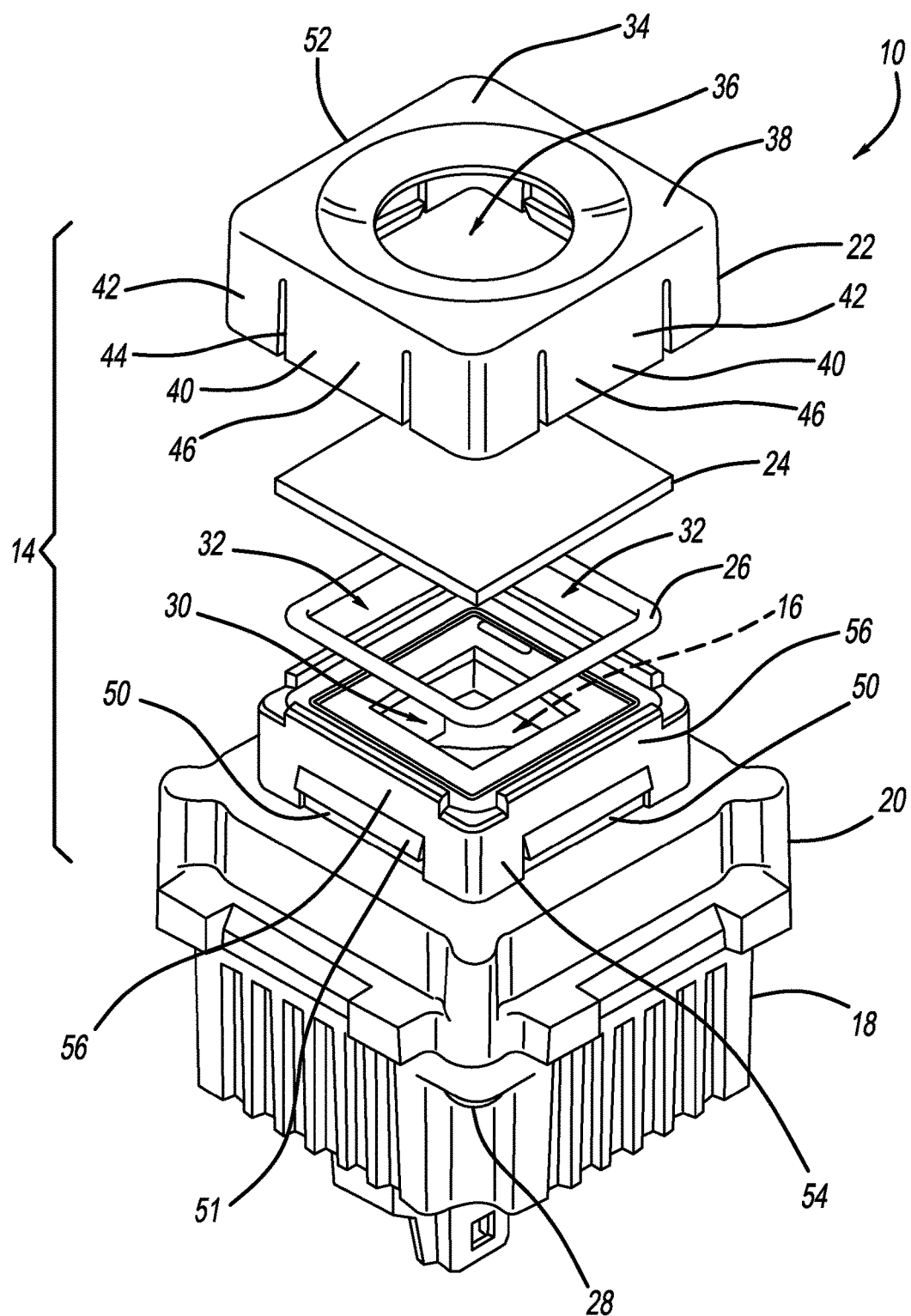
FIG. 1 is an exploded view of a camera arrangement for a motor vehicle in accordance with an exemplary embodiment.

Referring now to the drawings, FIG. 1 shows a camera arrangement 10 for a motor vehicle 12 (schematically illustrated as dashed lines in FIG. 8) in accordance with an exemplary embodiment. As shown, the camera arrangement 10 includes a sealed enclosure assembly 14 that at least partially encloses a camera system 16. Operatively coupled to the camera system 16 is a heatsink 18 to facilitate thermal management of the camera system 16.

Figure 8:
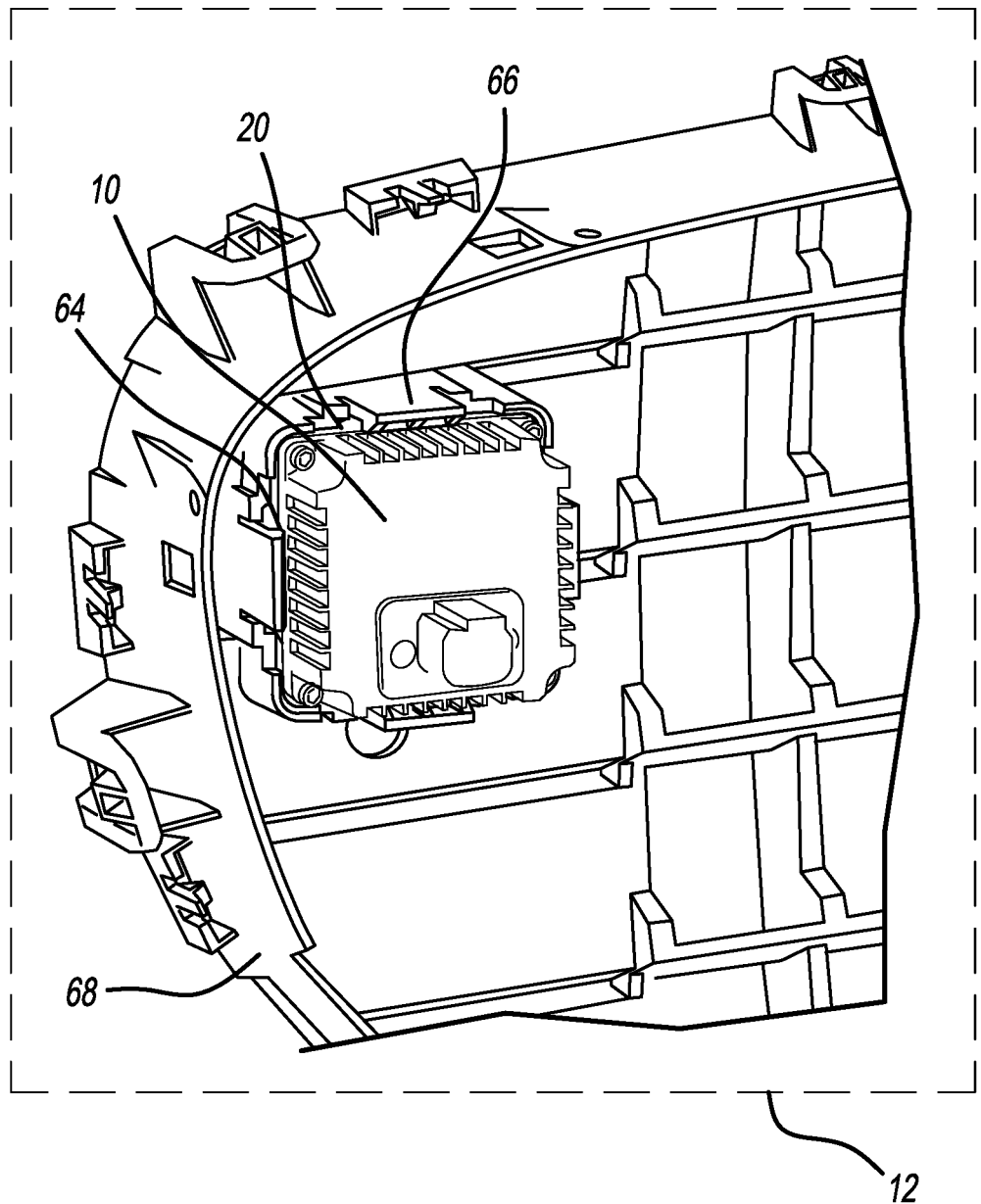
FIG. 8 is a perspective rear view of a component of a motor vehicle and a camera arrangement mounted thereon in accordance with an exemplary embodiment.

In an exemplary embodiment, the camera system 16 is configured to collect incoming light as data when mounted on the motor vehicle 12 (see FIG. 8). As used herein, the term "light" is used broadly and is understood to mean visible light, thermal scene energy or electromagnetic radiation in the infrared (IR) spectrum (IR light) or other detectable frequencies of electromagnetic radiation used in various camera system known to those skilled in the art. In one example, the camera system 16 collects incoming light in a vehicle running direction (e.g., forward direction) to collect images of a forward road environment while running and provides an image signal to an image processing unit that converts the image signal to a various kind of forward data that can be used by one or more other devices and/or control units for driving support. In another example, the camera system 16 is a thermal imaging night vision camera system that includes an optical arrangement adapted to focus incoming light in a vehicle running direction onto an infrared (IR) sensing arrangement. The IR sensing arrangement generates an output signal and the camera system 16 further includes processing electronics to process the output signal for assisting a vehicle driver in detecting, for example, a pedestrian(s), an animal(s), and/or the like.

The sealed enclosure assembly 14 includes a front housing 20 enclosing, for example, a forward facing portion of the camera system 16, a retainer 22, a window 24, and a sealing element 26. As illustrated, the heatsink 18 is attached to the front housing via threaded fasteners 28 (e.g., screws, bolts, or the like).

The front housing 20 has a housing opening 30 formed therethrough that is positioned in front of the camera system 16. In particular, the housing opening 30 is sized to permit light to pass through the housing opening 30 to the camera system 16, e.g., an optical arrangement of the camera system 16, for collecting, focusing, and/or processing the light.

Referring also to FIG. 3, disposed adjacent to and covering the housing opening 30 is the window 24. The window 24 is at least partially transparent to allow at least a portion of the light to pass through the window 24 to the camera system 16. In one example, the window 24 allows IR light to pass through the window 24 to impinge on the optical arrangement of the camera system 16.

As illustrated, the sealing element 26 is disposed between the window 24 and the front housing 20. The sealing element 26 can be a seal (e.g., ring type seal or the like), a gasket, a pressure sensitive adhesive, or the like. In an exemplary embodiment and as will be discussed in further detail below, the sealing element 26 sealingly interfaces with the window 24 and the front housing 20 to provide a moisture-tight seal. As illustrated, the sealing element 26 is disposed laterally adjacent to and around the housing opening 30 and has a seal opening 32 that is aligned with the housing opening 30 to allow the light to pass by the sealing element 26 to the camera system 16.

Referring to FIGS. 1-3, in an exemplary embodiment, the retainer 22 is disposed adjacent to the window 24. As illustrated, the retainer 22 includes a plate 34 that defines a retainer opening 36 and that has a perimeter portion 38 surrounding the retainer opening 36. The plate 34 is disposed adjacent to the window 24 with the retainer opening 36 aligned with the housing opening 30 to allow the light to pass by the retainer 22 to the camera system 16.

The retainer 22 includes a snapfit arrangement 40 that engages the front housing 20 to help hold the window 24 in place relative to the front housing 20 and the housing opening 30. In an exemplary embodiment, the retainer 22 includes sidewalls 42 that extend rearwardly from the perimeter portion 38 of the plate 34. The sidewalls 42 define the snapfit arrangement 40 in which a plurality of slits or slots 44 are spaced apart and formed extending through the sidewalls 42 to define a plurality of cantilever clips 46. The cantilever clips 46 correspondingly have positive snapfit features 48 disposed distally on the cantilever clips 46 engaging recessed portions 50 formed in the front housing 20.

In an exemplary embodiment, the recessed portions 50 of the front housing 20 receive the positive snapfit features 48 when the retainer 22 is advanced towards and placed in position onto the front housing 20 to firmly hold the plate 34 of the retainer 22 against the outer surface of the window 24, thereby pressing the inside surface of the window 24 against the sealing element 26 to compress the sealing element 26 and form a good seal between the window 24 and the front housing 20. In particular, the front housing 20 includes raised inclined surfaces 51 adjacent to the recessed portions 50 to facilitate spreading of the cantilever clips 46 when the positive snapfit features 48 interfaced with the raised inclined surfaces 51 as the retainer 22 and the front housing 20 are moved together. As the positive snapfit features 48 move past the raised inclined surfaces 51 to the recessed portions 50, the cantilever clips 46 snap back or return to their nominal position with the positive snapfit features 48 engaging the recessed portions 50 to couple (e.g., snapfit attach) the retainer 22 and the front housing 20 together.

In an exemplary embodiment, the retainer 22 is an external retainer 52 that mounts on an exterior 54 of the front housing 20 such that the retainer 22 is disposed outside of the front housing 20 with the plate 34 forward of the housing opening 30. The front housing 20 has forward projecting walls 56 with the recessed portions 50 on the exterior 54 of the forward projecting walls 56. The sidewalls 42 of the external retainer 52 extend rearwardly over the exterior 54 of the forward projecting walls 56. The positive snapfit features 48 of the cantilever clips 46 faced toward the exterior 54 of the front housing 20 so that the recessed portions 50 of the forward projecting walls 56 receive and retain the positive snapfit features 48 of the external retainer 52.

Figure 4:
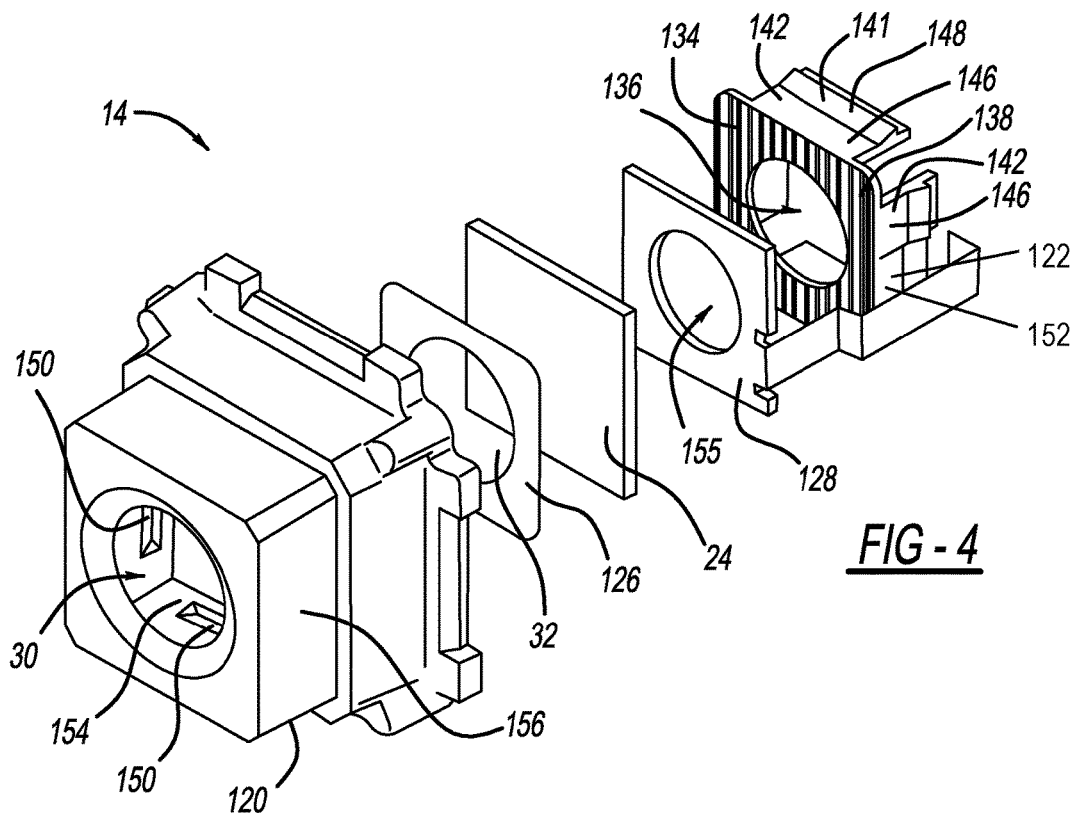
FIG. 4 is an exploded view of a camera arrangement for a motor vehicle in accordance with another exemplary embodiment.
Figure 5:
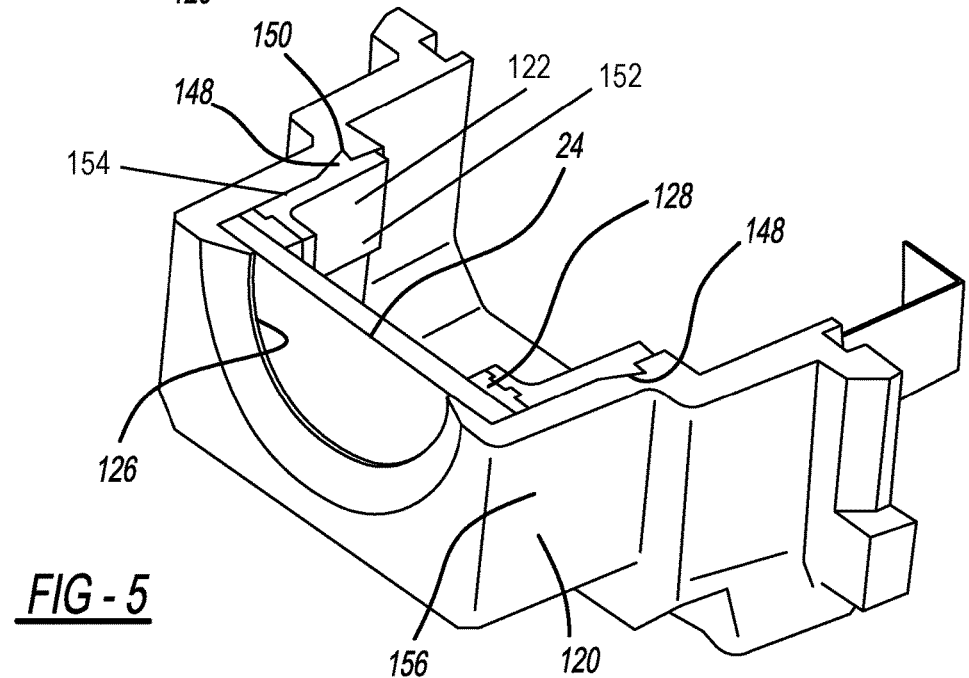
FIG. 5 is a perspective sectional view of a camera arrangement in accordance with another exemplary embodiment.

In another embodiment and with reference to FIGS. 4-5, the sealed enclosure assembly 140 includes a front housing 120, a sealing element 126, the window 24, a heater 128, and a retainer 122. In particular, the sealed enclosure assembly 140 shown in FIGS. 4-5 is similarly configured to the sealed enclosure assembly 14 shown in FIGS. 1-3 but with the exception that the sealed enclosure assembly 140 further includes the heater 128 and the retainer 122 is an internal retainer 152 that mounts inside on an interior 154 of the front housing 120 instead of on the front housing exterior.

The heater 128 is disposed between the window 24 and the retainer 122 and is configured to heat the window 24. The heater 128 is configured to warm the window 24 during cold and/or wet weather conditions and to help keep the window 24 dry and free of ice buildup. As illustrated, the heater 128 is configured as a flat film resistive heater and directly interfaces with the window 24 and the retainer. The heater 128 is disposed laterally adjacent to the housing opening 30 and defines a heater opening 155 that is aligned with the housing opening 30 to allow the light to pass by the heater 128 to the camera system 16 (see FIG. 1). Although not shown in FIGS. 1-3, the sealed enclosure assembly 14 may be similarly configured so as to include the heater 128.

The sealing element 126 is illustrated having a substantially flat form with the seal opening 32 formed therethrough to allow light to pass by the sealing element 126 as described above in relation to the sealing element 26. In particular, the sealing element 126 performs substantially the same function as the sealing element 26 and is selected from the group consisting of a seal, a gasket, and/or a pressure sensitive adhesive.

As described above in relation to the retainer 22, the internal retainer 152 includes a plate 134 that defines a retainer opening 136 and that has a perimeter portion 138 surrounding the retainer opening 136. The plate 134 is disposed adjacent to the window 24 with the retainer opening 136 aligned with the housing opening 30 to allow the light to pass by the retainer 122 to the camera system 16 (see FIG. 1).

In an exemplary embodiment, the internal retainer 152 includes sidewalls 142 that extend rearwardly from the perimeter portion 138 of the plate 134. The sidewalls 142 define a snapfit arrangement 141 that includes a plurality of cantilever clips 146 with positive snapfit features 148 disposed distally on the cantilever clips 146 engaging recessed portions 150 formed in the front housing 120. As illustrated, the internal retainer 152 mounts inside the front housing 120 on the interior 154 with the plate 134 rearward of the housing opening 30. The sidewalls 142 are covered by the interior 154 of the front housing 120.

The positive snapfit features 148 of the cantilever clips 146 faced toward the interior 154 of the front housing 120 so that the recessed portions 150 of the forward projecting walls 156 of the front housing 120 receive and retain the positive snapfit features 148 of the internal retainer 152 when the internal retainer 152 is advanced into position inside the interior 154 of the front housing 120. Notably, in this embodiment, the cantilever clips 146 will bend inwardly as the positive snapfit features 148 are advanced over the distal portions of the front housing 120 adjacent to the recessed portions 150 and will snap in place into the recessed portions 150 when the internal retainer 152 is fully seated in position in the interior 154 of the front housing 120. In an exemplary embodiment, the recessed portions 150 of the front housing 120 receive the positive snapfit features 148 to firmly hold the plate 134 of the retainer 122 against the inside surface of the window 24, thereby pressing the outside surface of the window 24 against the sealing element 126 to compress the sealing element 126 and form a good seal between the window 24 and the front housing 120.

Figure 6:
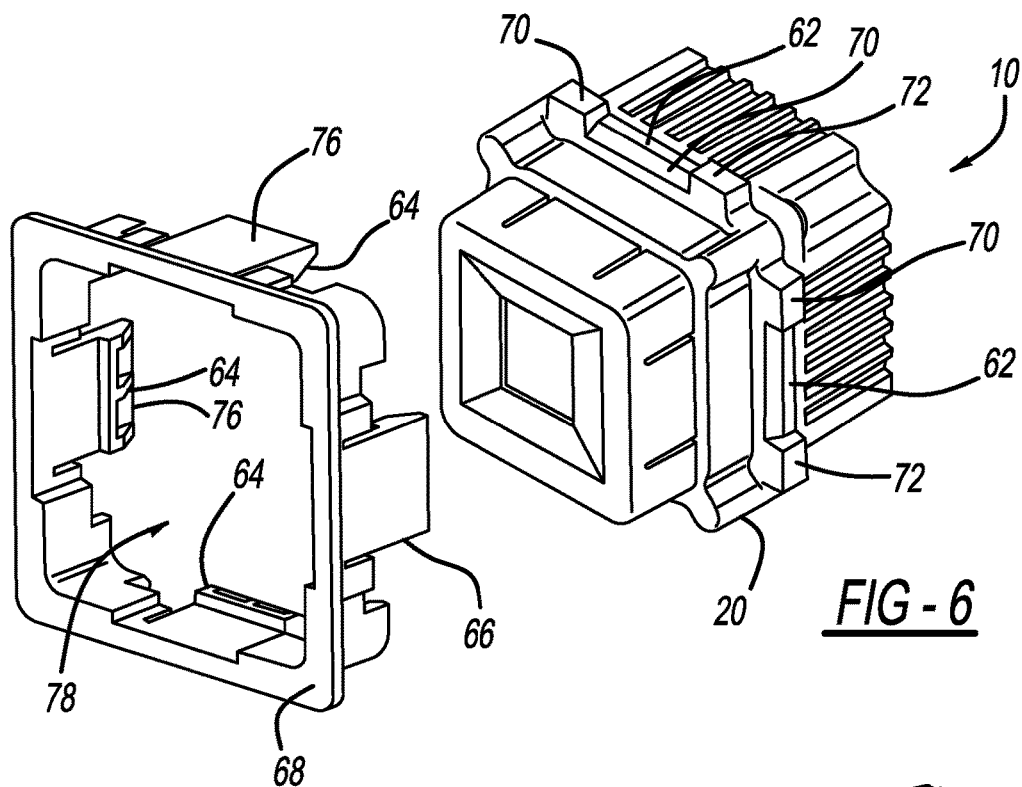
FIG. 6 is a perspective view of a portion of a component of a motor vehicle and a camera arrangement in accordance with an exemplary embodiment.
Figure 7:
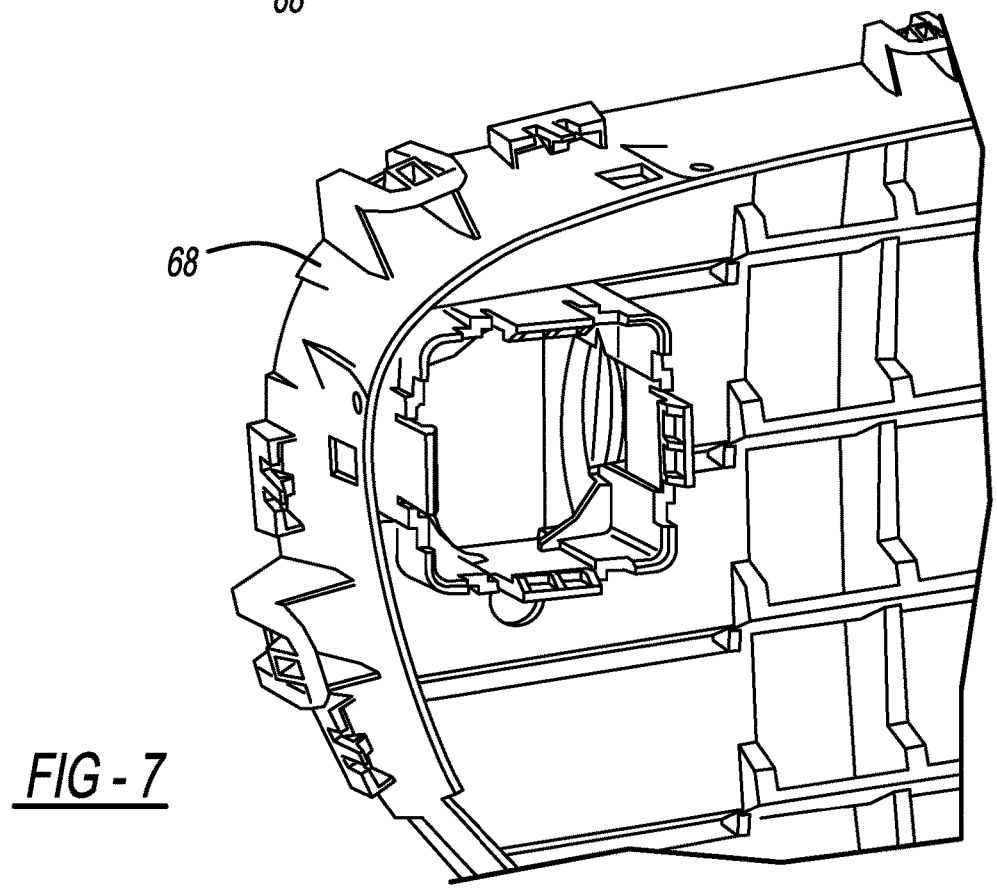
FIG. 7 is a perspective rear view of a component of a motor vehicle in accordance with an exemplary embodiment.

Referring to FIGS. 6-8, in an exemplary embodiment, the front housing 20 (and/or 120) of the camera arrangement 10 has one or more recessed portions 62 that correspondingly receive one or more positive snapfit features 64 of a snapfit arrangement 66 from a component 68 (e.g., front grill reinforcement structure or the like) of the motor vehicle 12 to mount the camera arrangement 10 on the component 68. In particular and as illustrated, the front housing 20, 120 includes raised portions 70 and 72 and the recessed portions 62 are correspondingly disposed between the raised portions 70 and 72. The recessed portions 62 include inclined surfaces 74 that facilitate spreading of the cantilever clips 76 of the component 68 when the positive snapfit features 64 interfaced with the inclined surfaces 74 as the camera arrangement 10 and the component 68 are moved together to position the camera arrangement 10 through the opening 78 of the component 68. As the positive snapfit features 64 moved past the inclined surfaces 74 to the retaining surfaces 80 on the backside of the front housing 20, 120, the cantilever clips 76 snap back or return to their nominal position to couple (e.g., snapfit attach) the component 68 to the camera arrangement 10 such as illustrated in FIG. 8.

Accordingly camera arrangements for motor vehicles have been described. The exemplary embodiments taught herein include a front housing that at least partially encloses a camera system and has a housing opening formed therethrough for allowing light to pass through to the camera system. The front housing is configured to engagingly receive a snapfit arrangement(s) from a window retainer that forms part of a sealed enclosure assembly system and/or from a component of a motor vehicle. As such, the attachment means associated with the camera arrangement can be relatively quick, simple and inexpensive, without requiring any special tools to facilitate assembly of the camera arrangement and/or attachment of the camera arrangement to the motor vehicle.

As a person skilled in the art will readily appreciate, the above description is meant as an illustration of the implementation of the principles of this invention. This description is not intended to limit the scope or application of this invention in that the invention is susceptible to modification, variation, and change, without departing from the spirit of this invention as defined in the following claims.

The invention claimed is:

1. A camera arrangement for a motor vehicle, the arrangement comprising:
   a front housing for at least partially enclosing a camera system and having a housing opening formed therethrough for allowing light to pass through to the camera system;
   a window at least partially transparent to the light and covering the housing opening; and
   a retainer disposed adjacent to the window and comprising a snapfit arrangement that engages the front housing to help hold the window in place relative to the front housing, wherein the retainer comprises:
   a plate that defines a retainer opening aligned with the housing opening and that has a perimeter portion surrounding the retainer opening, and
   sidewalls extending from the perimeter portion to an opposite direction from a side of the plate faced to the housing opening, wherein the sidewalls of the retainer extend rearward and are covered by at least a portion of the interior of the front housing,
   wherein the sidewalls define the snapfit arrangement configured as a plurality of cantilevered clips correspondingly having positive snapfit features disposed distally on the cantilever clips,
   wherein the front housing has recessed portions that receive the positive snapfit features, wherein the positive snapfit features of the cantilever clips face towards the interior of the front housing, and wherein the portion of the interior of the front housing defines the recessed portions, and
   wherein the retainer is an internal retainer that mounts on an interior of the front housing such that the retainer is disposed inside the front housing with the plate rearward of the housing opening.

2. The camera arrangement of claim 1, wherein the window is disposed between the front housing and the retainer.

3. The camera arrangement of claim 2, further comprising a sealing element that is disposed between the window and the front housing.

4. The camera arrangement of claim 3, wherein the sealing element is selected from the group consisting of a seal, a gasket, and a pressure sensitive adhesive.

5. The camera arrangement of claim 3, wherein the sealing element sealingly interfaces with the window and the front housing.

6. The camera arrangement of claim 3, wherein the sealing element is disposed laterally adjacent to the housing opening and defines a seal opening aligned with the housing opening to allow the light to pass by the sealing element to the camera system.

7. The camera arrangement of claim 1, further comprising a heater that is disposed between the window and the retainer.

8. The camera arrangement of claim 7, wherein the heater directly interfaces with the window and the retainer.

9. The camera arrangement of claim 7, wherein the heater is disposed laterally adjacent to the housing opening and defines a heater opening aligned with the housing opening to allow the light to pass by the heater to the camera system.

10. The camera arrangement of claim 1, wherein the retainer is an external retainer that mounts on an exterior of the front housing such that the retainer is disposed outside of the front housing with the plate forward of the housing opening.

11. The camera arrangement of claim 10, wherein the sidewalls of the external retainer extend rearward over at least a portion of the exterior of the front housing.

12. The camera arrangement of claim 11, wherein the positive snapfit features of the cantilever clips face towards the exterior of the front housing, and wherein the portion of the exterior of the front housing defines the recessed portions that receive the positive snapfit features.

13. The camera arrangement of claim 1, further comprising the camera system at least partially enclosed by the front housing.

14. The camera arrangement of claim 13, further comprising a heatsink that is operatively coupled to the camera system, and wherein the heatsink and the front housing are coupled together to substantially enclose the camera system.

15. The camera arrangement of claim 1, wherein the front housing has one or more mounting recessed portions configured to correspondingly receive one or more positive snapfit mounting features from a component of the motor vehicle to mount the camera arrangement on the component.

* * * * *